US012688080B2

(12) United States Patent
Kwon et al.

(10) Patent No.: US 12,688,080 B2
(45) Date of Patent: Jul. 21, 2026

(54) SYSTEM OBJECT TRACKING FOR RULE VIOLATION DETECTION

(71) Applicant: Microsoft Technology Licensing, LLC, Redmond, WA (US)

(72) Inventors: Hyuk Joon Kwon, Redmond, WA (US); Jakob F. Lichtenberg, Redmond, WA (US); Matthew J. Woolman, Seattle, WA (US); Christopher Peter Kleynhans, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 139 days.

(21) Appl. No.: 18/627,923

(22) Filed: Apr. 5, 2024

(65) Prior Publication Data

US 2025/0315327 A1      Oct. 9, 2025

(51) Int. Cl.
 *G06F 11/00* (2006.01)
 *G06F 11/07* (2006.01)
(52) U.S. Cl.
 CPC ...... *G06F 11/0754* (2013.01); *G06F 11/0727* (2013.01)
(58) Field of Classification Search
 CPC ............. G06F 11/0754; G06F 11/0727; G06F 11/073; G06F 11/3037; G06F 11/079; G06F 11/0793
 See application file for complete search history.

(56) References Cited

U.S. PATENT DOCUMENTS

| | | | |
|---|---|---|---|
| 7,587,771 B2 * | 9/2009 | Borror ................. | A47D 15/001 |
| | | | 5/652 |
| 11,277,435 B2 * | 3/2022 | Itikarlapalli .......... | H04L 63/102 |
| 11,283,880 B2 * | 3/2022 | Diamant ................ | H04L 63/10 |
| 11,843,631 B2 * | 12/2023 | Ackerman .......... | H04L 63/1458 |
| 2018/0089007 A1 | 3/2018 | Gottschlich | |
| 2021/0026533 A1 | 1/2021 | Vu | |

OTHER PUBLICATIONS

"Using Timer Objects" Accessed on link https://learn.microsoft. com/en-us/windows-hardware/drivers/kernel/using-timer-objects, 2021, 2 pages.
Extended European search report received for European Application No. 25167956.9, mailed on Sep. 22, 2025, 10 pages.

* cited by examiner

*Primary Examiner* — Amine Riad

(57) ABSTRACT

Systems and methods are provided for implementing system object tracking for rule violation detection. In various examples, in response to a trigger event, a computing system may track a system object by tracking a tracker object corresponding to a memory address range of a database that has been allocated to the system object. Contemporaneous with the trigger event, the computing system determines, based on tracking of the tracker object, whether a system rule associated with the system object has been violated. Based on a determination that a system rule associated with the system object has been violated, the computing system triggers at least one action associated with the system object, including performing a contemporaneous error check, sending messages indicating an error caused by violation of the system rule, identifying a system component or driver that caused the error, and/or causing an immediate system crash.

20 Claims, 9 Drawing Sheets

Figure 2A:
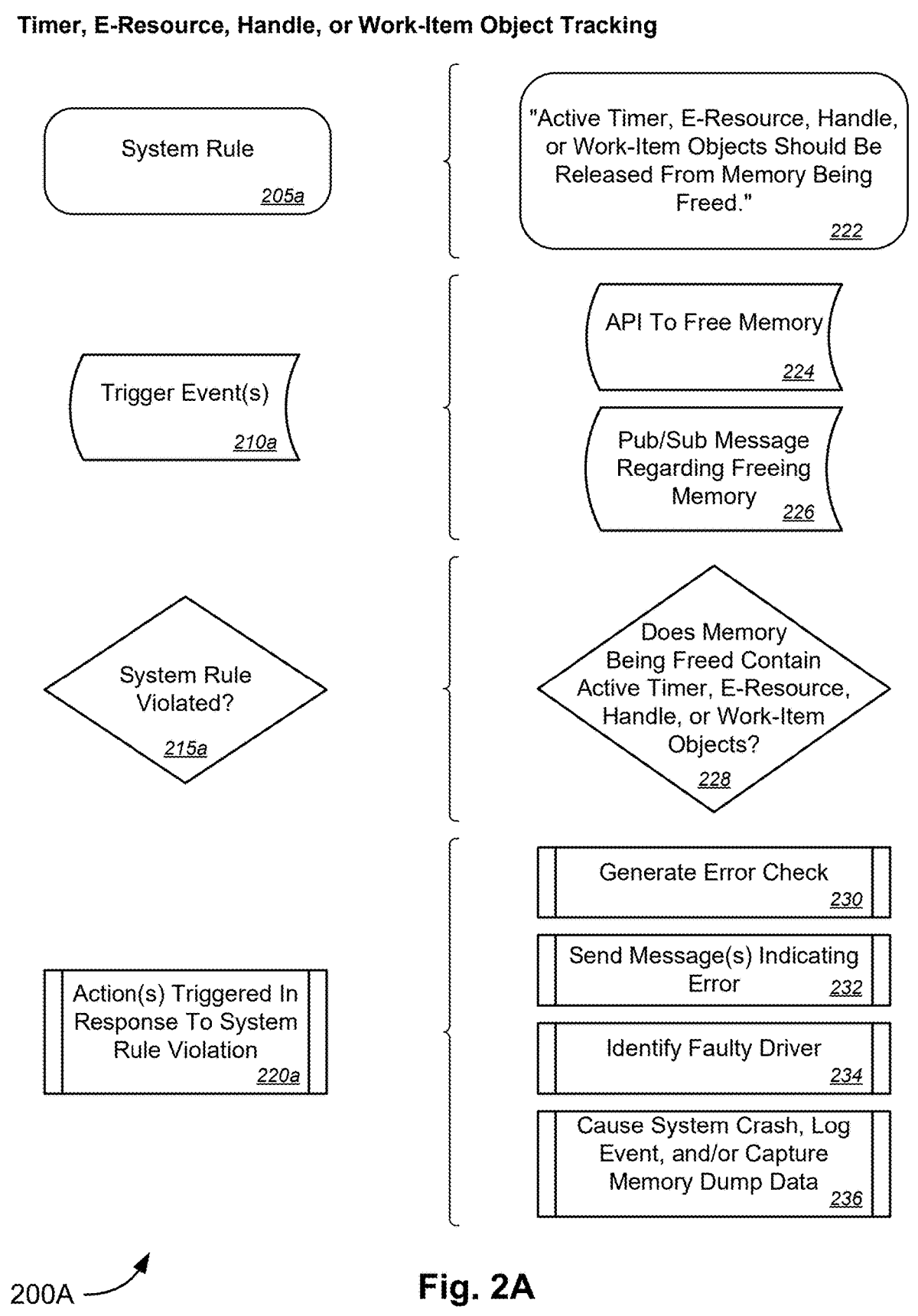

Timer, E-Resource, Handle, or Work-Item Object Tracking

System Rule

_205a_

"Active Timer, E-Resource, Handle, or Work-Item Objects Should Be Released From Memory Being Freed."

_222_

Trigger Event(s)

_210a_

API To Free Memory

_224_

Pub/Sub Message Regarding Freeing Memory _226_

System Rule Violated?

_215a_

Does Memory Being Freed Contain Active Timer, E-Resource, Handle, or Work-Item Objects?

_228_

Generate Error Check _230_

Send Message(s) Indicating Error _232_

Identify Faulty Driver _234_

Cause System Crash, Log Event, and/or Capture Memory Dump Data _236_

Action(s) Triggered In Response To System Rule Violation

System Lock Object Tracking

System Rule

205b

"System Lock Objects Should Be Used One At A Time."

238

API To Use A System Lock Object 240

Indication That A System Component Is Attempting To Use System Lock Object 242

Trigger Event(s)

210b

System Rule Violated?

215b

Had System Lock Object Previously Not Been Removed From The Database After Having Previously Been Released?

244

Generate Error Check

246

Send Message(s) Indicating Error 248

Identify Faulty Driver

250

Cause System Crash, Log Event, and/or Capture Memory Dump Data 252

Action(s) Triggered In Response To System Rule Violation

220b

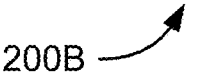

Callback Object Tracking

System Rule
_205c_

"Unregistered Callback Objects Should Be Removed From Memory Blocks Of The Database."
_254_

Trigger Event(s)
_210c_

API To Register A Callback Object _256_

Indication That A System Driver Is Attempting to Register A Callback Object _258_

System Rule Violated?
_215c_

Had Callback Object Previously Not Been Removed From The Database After Having Previously Been Unregistered?
_260_

Action(s) Triggered In Response To System Rule Violation
_220c_

Generate Error Check
_262_

Send Message(s) Indicating Error
_264_

Identify Faulty Driver
_266_

Cause System Crash, Log Event, and/or Capture Memory Dump Data
_268_

200C

Fig. 2C

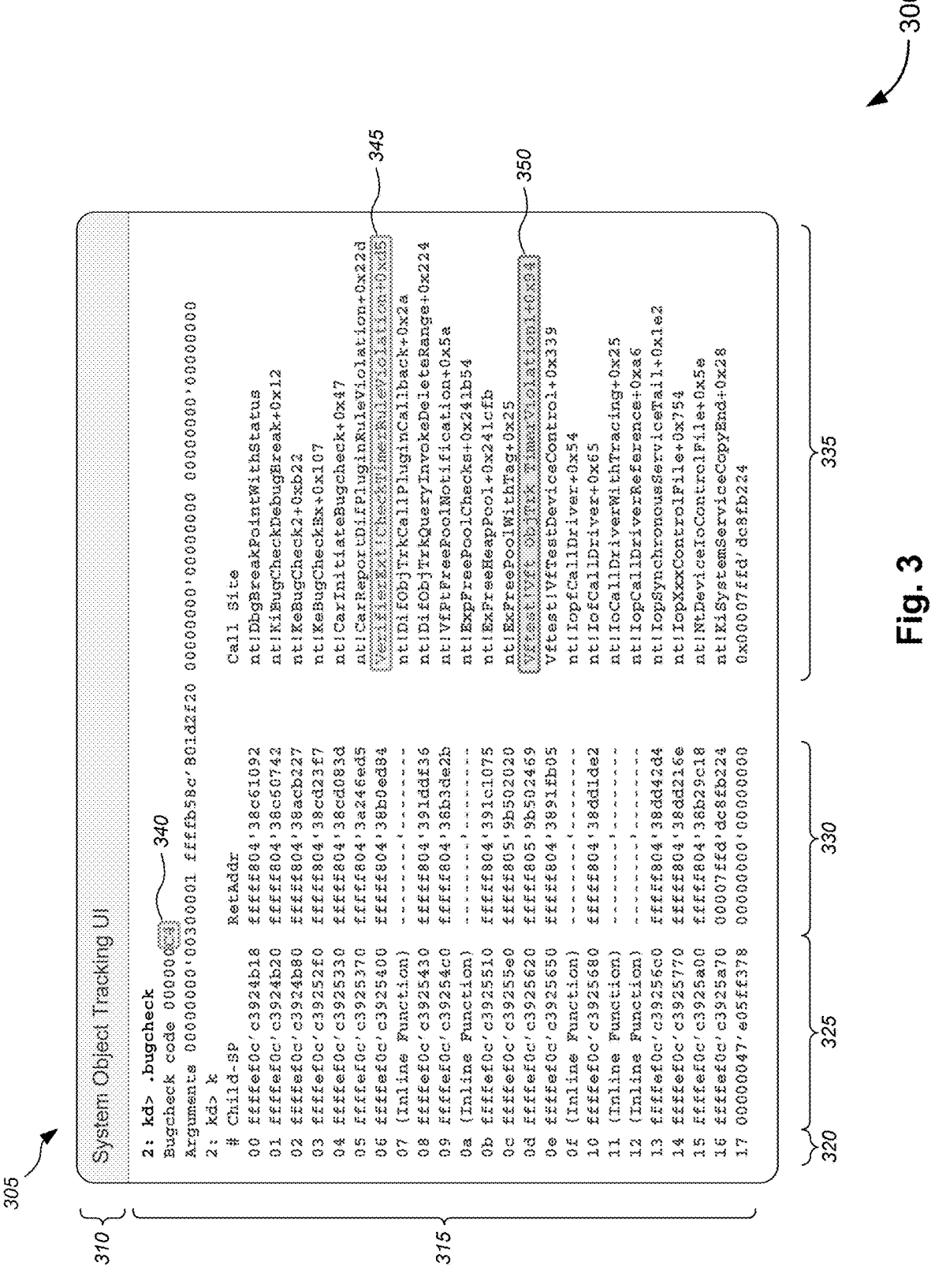

```
System Object Tracking UI

2: kd> .bugcheck                                340
Bugcheck code 00000[CA]
Arguments 00000000'00300001 fffb58c'801d2f20 00000000'00000000 00000000'00000000
2: kd> k
# Child-SP           RetAddr            Call Site
00 fffffef0c'c3924b18  fffff804'38c61092  nt!DbgBreakPointWithStatus
01 fffffef0c'c3924b20  fffff804'38c50742  nt!KiBugCheckDebugBreak+0x12
02 fffffef0c'c3924b80  fffff804'38acb227  nt!KeBugCheck2+0xb22
03 fffffef0c'c3925210  fffff804'38cd23f7  nt!KeBugCheckEx+0x107
04 fffffef0c'c3925330  fffff804'38cd083d  nt!CarInitiateBugcheck+0x47
05 fffffef0c'c3925370  fffff804'3a246ed5  nt!CarReportDifPluginRuleViolation+0x22d
06 fffffef0c'c3925400  fffff804'38b0ed84  Verifier!VfCheckTimerViolation+0xd5         345
07 (Inline Function)   --------'--------  nt!DifObjTrkCallPluginCallback+0x2a
08 fffffef0c'c3925430  fffff804'391ddf36  nt!DifObjTrkQueryInvokeDeleteRange+0x224
09 fffffef0c'c3925430  fffff804'36b3de2b  nt!VfPtFreePoolNotification+0x5a
0a (Inline Function)   --------'--------  nt!ExpFreePoolChecks+0x241b54
0b fffffef0c'c3925510  fffff804'391c1075  nt!ExFreeHeapPool+0x241cfb
0c fffffef0c'c3925550  fffff805'9b502020  nt!ExFreePoolWithTag+0x25
0d fffffef0c'c3925620  fffff805'9b502469  Vrfcall!VfCheckTimerViolation+0x94       350
0e fffffef0c'c3925650  fffff804'391f1b05  VftestiVfTestDeviceControl+0x339
0f (Inline Function)   --------'--------  nt!IopfCallDriver+0x54
10 fffffef0c'c3925680  fffff804'38d1de2  nt!IofCallDriver+0x65
11 (Inline Function)   --------'--------  nt!IopCallDriverWithTracing+0x25
12 (Inline Function)   --------'--------  nt!IopCallDriverReference+0xa6
13 fffffef0c'c392556c0  fffff804'38dd42d4  nt!IopSynchronousServiceTail+0x1e2
14 fffffef0c'c3925770  fffff804'38dd216e  nt!IopXxxControlFile+0x754
15 fffffef0c'c3925a00  fffff804'36b29c18  nt!NtDeviceIoControlFile+0x5e
16 fffffef0c'c3925a70  00007ffd'dc8fb224  nt!KiSystemServiceCopyEnd+0x28
17 00000047'e05ff378  00000000'00000000  0x00007ffd'dc8fb224
```

Fig. 3

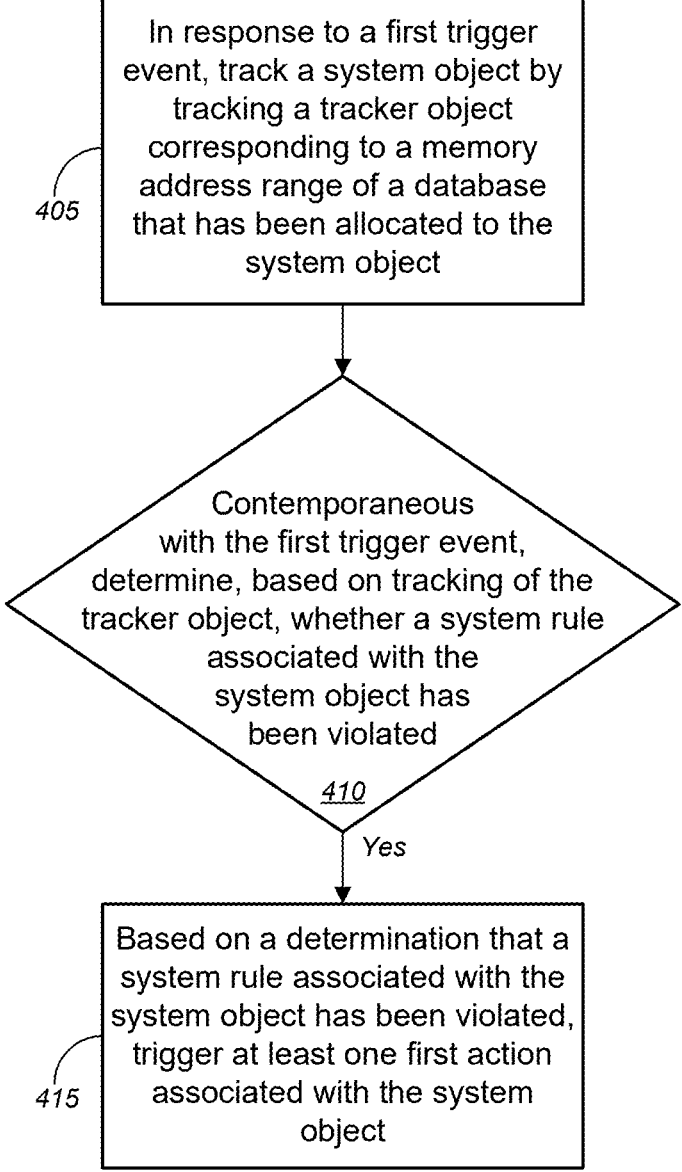

In response to a first trigger event, track a system object by tracking a tracker object corresponding to a memory address range of a database that has been allocated to the system object

405

Contemporaneous with the first trigger event, determine, based on tracking of the tracker object, whether a system rule associated with the system object has been violated

*410*

*Yes*

Based on a determination that a system rule associated with the system object has been violated, trigger at least one first action associated with the system object

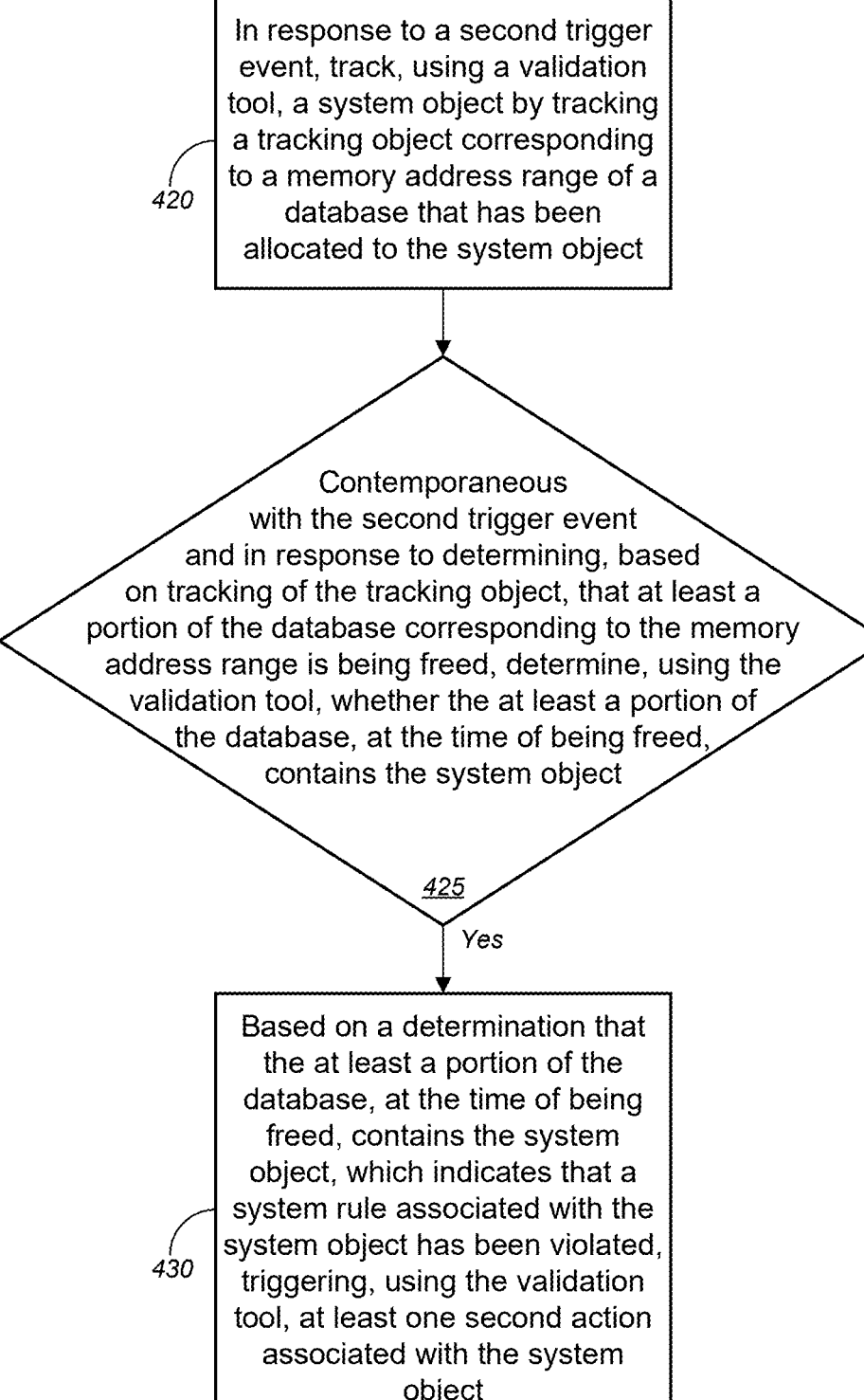

In response to a second trigger event, track, using a validation tool, a system object by tracking a tracking object corresponding to a memory address range of a database that has been allocated to the system object

420

Contemporaneous with the second trigger event and in response to determining, based on tracking of the tracking object, that at least a portion of the database corresponding to the memory address range is being freed, determine, using the validation tool, whether the at least a portion of the database, at the time of being freed, contains the system object

425

Yes

Based on a determination that the at least a portion of the database, at the time of being freed, contains the system object, which indicates that a system rule associated with the system object has been violated, triggering, using the validation tool, at least one second action associated with the system object

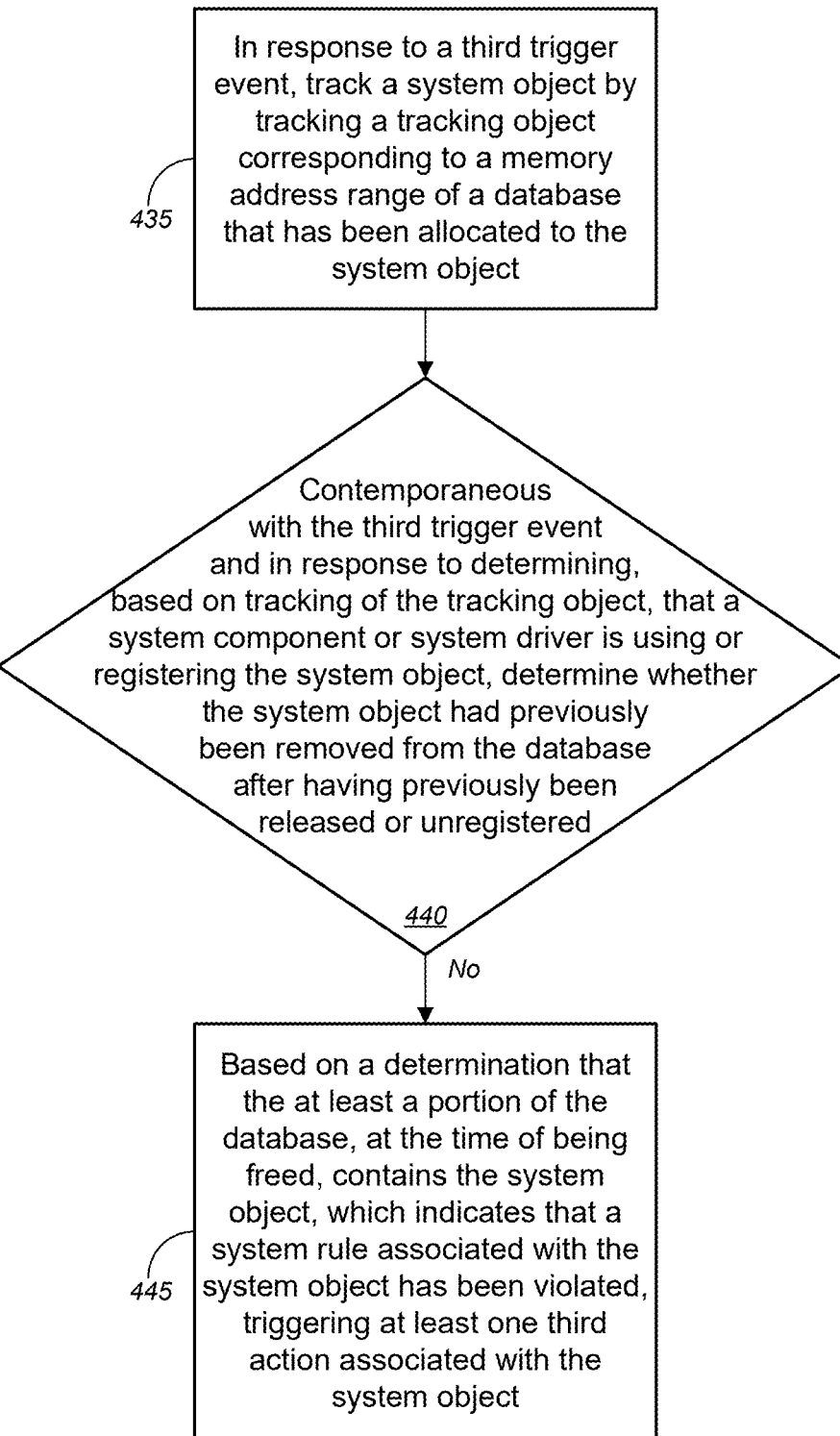

In response to a third trigger event, track a system object by tracking a tracking object corresponding to a memory address range of a database that has been allocated to the system object

435

Contemporaneous with the third trigger event and in response to determining, based on tracking of the tracking object, that a system component or system driver is using or registering the system object, determine whether the system object had previously been removed from the database after having previously been released or unregistered

440

No

Based on a determination that the at least a portion of the database, at the time of being freed, contains the system object, which indicates that a system rule associated with the system object has been violated, triggering at least one third action associated with the system object

SYSTEM OBJECT TRACKING FOR RULE VIOLATION DETECTION

BACKGROUND

System objects (e.g., operating system ("OS") objects) are bound by system rules defining when they should be stored in, or removed from, memory or a database. Violations of such system rules may lead to system crashes. Although error checks may be performed to identify causes of the rule violations, in some cases, such error checks occur long after the rule violations, thus resulting in difficulty in identifying root causes of the rule violations. In some instances, memory containing evidence of the causes of the rule violations may have been overwritten over the duration. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for system object tracking for rule violation detection. In various examples, in response to a first trigger event, a computing system may track a system object by tracking a tracker object corresponding to a memory address range of a database that has been allocated to the system object. Contemporaneous with the first trigger event, the computing system determines, based on tracking of the tracker object, whether a system rule associated with the system object has been violated. Based on a determination that a system rule associated with the system object has been violated, the computing system triggers at least one action associated with the system object, including performing a contemporaneous error check, sending messages indicating an error caused by violation of the system rule associated with the system object, identifying a system component or driver that caused the error, and/or causing an immediate system crash. In this manner, the computing system can respond to the rule violation soon after the rule violation occurs, where the current state of the OS (including evidence related to the error caused by the rule violation) is still available (and, in a way, preserved by such contemporaneous actions).

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

2

Figure 1:
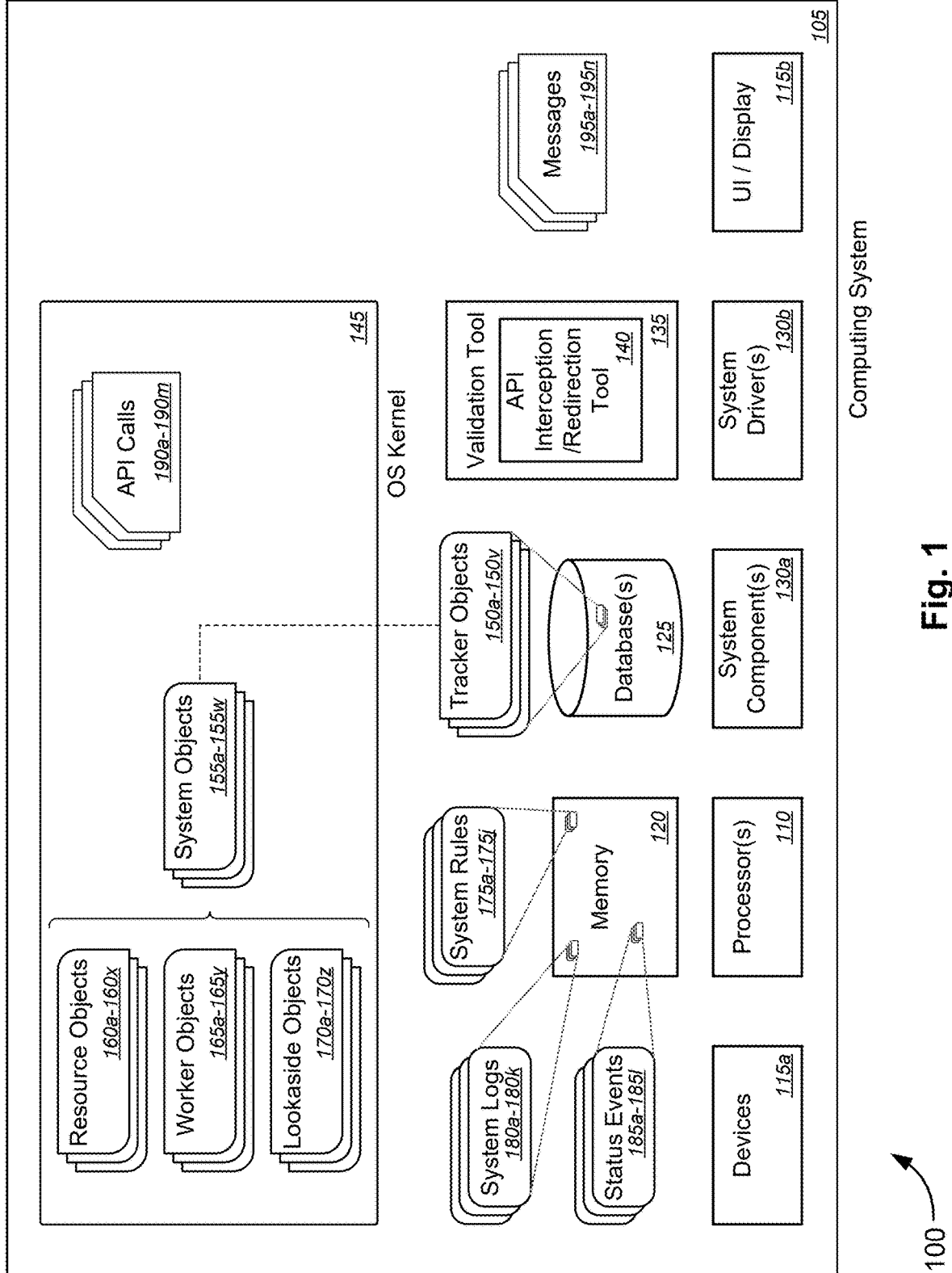

FIG. 1 depicts an example system for implementing system object tracking for rule violation detection.

FIGS. 2A-2C depict various example applications for implementing system object tracking for rule violation detection.

FIG. 3 depicts an example UI for displaying results of an error check initiated when implementing system object tracking for rule violation detection.

FIGS. 4A-4C depict various examples methods for implementing system object tracking for rule violation detection.

Figure 5:
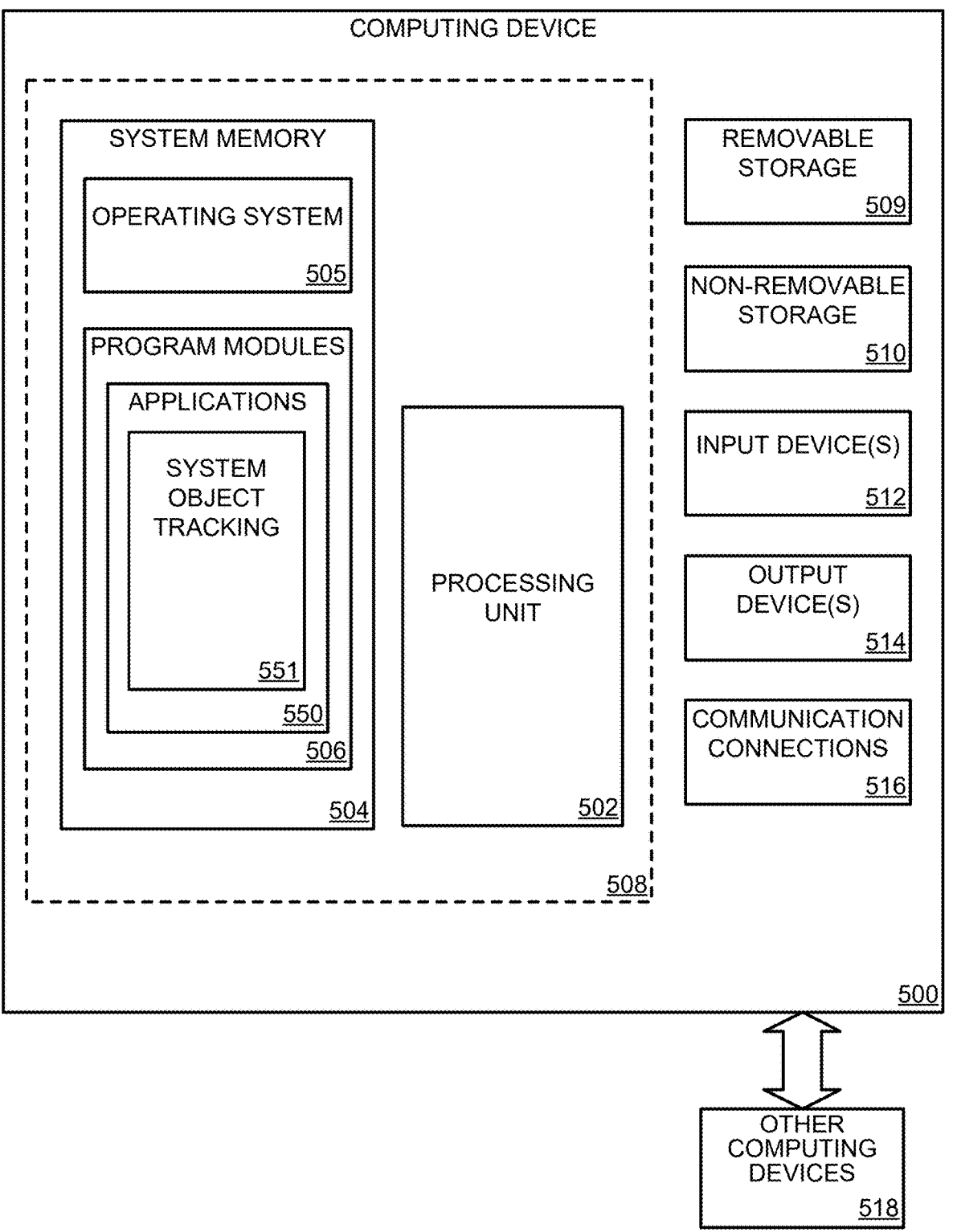

FIG. 5 depict a block diagram illustrating example physical components of a computing device with which aspects of the technology may be practiced.

DETAILED DESCRIPTION OF CERTAIN EMBODIMENTS

Generally, a driver can allocate memory to represent a system object and can initiate an application programming interface ("API") call to a kernel to indicate to the kernel that the allocated memory should be treated as the system object. The allocated memory may be accessed by the kernel for various reasons depending on the type of system object. For example, a timer object is used for kernel-mode drivers to request a OS to execute a routine of a designated driver at designated time, either once or periodically. Another example pertains to a non-recursive lock object, where upon an event of a driver's thread grabbing an exclusive lock, the OS can block other threads from accessing the same lock for synchronization purposes. Before freeing the allocated memory, however, the driver is supposed to call an appropriate API to inform the kernel either to remove the corresponding time in an appropriate manner or that the system object is no longer allocated to the memory (e.g., the system object is being released from the memory). A pairwise API set for timer object queuing or removal include "KeSet-Timer" API and "KeCancelTimer" API. If the driver does not do so, the next time that the kernel attempts to access the allocated memory, a system crash and/or memory corruption may occur. By the time an error check is performed, however, the root cause of the bad memory access may be long in past, making it difficult to pinpoint the root cause in order to fix the problem.

The technology discussed herein utilizes a validation tool that, in some examples, may be used to identify drivers that free memory without informing the kernel to discontinue referencing the allocated memory for the system object. The validation tool may initiate an error check contemporaneous with (or soon after) rule violation when the root cause is easily identifiable instead of letting the rule violation corrupt memory and/or kernel structures that lead to the error being difficult to diagnose in the future. In examples, the validation tool generally tracks the system objects to identify rule violations and to initiate actions (including performing an error check, notifying the kernel, notifying a user, identifying a faulty driver causing the rule violation, and/or initiating an immediate system crash) contemporaneous (e.g., at the same time as, in real-time, or in near-real-time) with identifying the rule violation. In some examples, the validation tool may be implemented using a plugin of the validation tool.

Various modifications and additions can be made to the embodiments discussed without departing from the scope of the disclosed techniques. For example, while the embodiments described above refer to particular features, the scope of the disclosed techniques also includes embodiments having different combinations of features and embodiments that do not include all of the above-described features.

We now turn to the embodiments as illustrated by the drawings. FIGS. 1-5 illustrate some of the features of a method, system, and apparatus for implementing driver validation, and, more particularly, to methods, systems, and apparatuses for implementing system object tracking for rule violation detection, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing system object tracking for rule violation detection. System 100 includes computing system 105, which includes at least one of processor(s) 110, hardware devices 115*a*, user interface ("UI") or display screen 115*b*, memory 120, database(s) 125, system component(s) 130*a*, system driver(s) 130*b*, validation tool 135 (including API interception or redirection tool 140), and/or operating system ("OS") kernel 145. System 100 further includes one or more tracker objects 150*a*-150*v* (collectively, "tracking objects 150") each corresponding to a memory address range of database 125 that has been allocated to a corresponding one of one or more system objects 155*a*-155*w* (collectively, "system objects 155") in the OS kernel 145. The one or more system objects 155 may include at least one of one or more resource objects 160*a*-160*x* (collectively, "resource objects 160"), one or more worker objects 165*a*-165*y* (collectively, "worker objects 165"), and/or one or more lookaside objects 170*a*-170*z* (collectively, "lookaside objects 170"). System 100 may further include one or more system rules 175*a*-175*j* (collectively, "system rules 175"), one or more system logs 180*a*-180*k* (collectively, "system logs 180"), and/or one or more status events 185*a*-185*l* (collectively, "status events 185") that may be stored on memory 120. In examples, validation tool 135 and/or API interception or redirection tool 140 may detect, intercept, and/or redirect API calls 190*a*-190*m* (collectively, "API calls 190") that are associated with either system objects 155 and/or tracker objects 150 (or the memory address ranges corresponding to the tracker objects), and may send messages 195*a*-195*n* (collectively, "messages 195") indicating an error(s) caused by violation of a system rule(s) 175 to OS kernel 145 and/or to a user via UI or display 115*b*. Herein, j, k, l, m, n, v, w, x, y, and z are non-negative integer numbers that may be either all the same as each other, all different from each other, or some combination of same and different (e.g., one set of two or more having the same values with the others having different values, a plurality of sets of two or more having the same value with the others having different values). In some examples, the validation tool may be implemented using a plugin, which is a software component that adds specific features to an existing computer program, in this case, to enable creation of tracker objects (or memory address ranges) for corresponding OS objects. In some cases, the tracker objects may be stored in, or removed from, a balanced or performant database (e.g., database(s) 125). The plugin may be used to enforce rules (e.g., system rules 175) at the time of violation using the tracker objects, rather than allowing the crash happen and debugging too late.

An object, as used herein, refers to a variable, a data structure, and/or a function, and contains a value and is referenced by an identifier. As used herein, a resource object 160 (also referred to herein as an 'electronic resource ("e-resource") object') is an individual piece of data, or an object, that contains data that is used to provision resources (or e-resources) to users and applications. In some examples, the one or more worker objects 165 include timer objects, handle objects, work-item objects, and/or system lock objects. As used herein, a worker object is an object that performs tasks in the background within the OS kernel 145. A timer object, as used herein, is an object that runs timer tasks in the background within the OS kernel 145 (e.g., scheduling running of other tasks, functions, or applications after a defined time interval has elapsed). As used herein, a handle object is an object containing a reference to a resource that is used when a software application references blocks of memory or objects that are managed by a database or an OS. A work-item object, as used herein, is an object that contains a task for a set of work objectives to be performed in the background within the OS kernel 145. As used herein, a system lock object is an object that is used to synchronize access to the same data by more than one program, and that is used to lock access (by other programs) to data or objects that are being inserted or changed. A callback object, as used herein, is an object that contains a reference to executable code and that is invoked in response to an event occurring. As used herein, a lookaside object is an object containing a reference to a database or a cache for storing other objects, code, data, etc. Although the figures below are described with reference to these example system objects, the various embodiments are not so limited, and any suitable system objects may be tracked for rule violation determination.

In operation, computing system 105, processor(s) 110, validation tool 135, and/or API interception or redirection tool 140 may perform methods for implementing system object tracking for rule violation detection, as described in detail with respect to FIGS. 2-4. For example, example applications 200A-200C as described below with respect to FIGS. 2A-2C, example UI 300 as described below with respect to FIG. 3, and example methods 400A-400C as described below with respect to FIGS. 4A-4C may be applied with respect to the operations of system 100 of FIG. 1.

FIGS. 2A-2C depict various example applications 200A-200C for implementing system object tracking for rule violation detection. Referring to FIGS. 2A-2C, a computing system (e.g., computing system 105 or processor(s) 110 of FIG. 1), in some cases using a validation tool (e.g., validation tool 135 of FIG. 1), may implement system object tracking using one or more system rules 205*a*-205*c* (collectively, "system rules 205") and one or more trigger events 210*a*-210*c* (collectively, "trigger events 210") that are based on the corresponding one or more system rules 205*a*-205*c*. Based on a determination that a system rule among the one or more system rules 205 has been violated (at operation 215*a*, 215*b*, or 215*c*), one or more actions are triggered in response to the system rule violation (at operation 220*a*, 220*b*, or 220*c*). FIG. 2A depicts an example application 200A for implementing timer, e-resource, handle, or work-item object tracking for rule violation detection. FIG. 2B depicts an example application 200B for implementing system lock object tracking for rule violation detection. FIG. 2C depicts an example application 200C for implementing callback object tracking for rule violation detection.

With reference to FIG. 2A, system rule 205*a* includes a rule 222 indicating that active timer objects, active e-resource objects, active handle objects, or active work-item objects should be released from memory blocks of the database that are being freed. In examples, the one or more trigger events 210*a* includes at least one of: (a) detecting, intercepting, or redirecting an API call 224 to free memory; or (b) a publication/subscription ("pub/sub") message 226 regarding freeing memory. In response to (and contemporaneous with) the one or more trigger events 210*a*, the computing system and/or the validation tool may determine whether the at least a portion of the database, at the time of being freed, contains any active timer objects, active e-resource objects, active handle objects, or active work-item objects (at operation 228).

In some examples, the one or more actions 220*a* triggered in response to system rule violation includes generating an error check, contemporaneous with the second trigger event, to identify a root cause of the violation of the system rule associated with the one of a timer object, an e-resource object, a handle object, or a work-item object (at operation 230). The one or more actions 220*a* alternatively or additionally include sending a message(s) indicating the error (at operation 232). In examples, sending the message(s) (at operation 232) includes at least one of sending a message to a user indicating an error caused by the violation of the system rule associated with the one of the timer object, the e-resource object, the handle object, or the work-item object; or sending a message to an OS kernel indicating an error caused by the violation of the system rule associated with the one of the timer object, the e-resource object, the handle object, or the work-item object. The one or more actions 220*a* alternatively or additionally include identifying a driver that freed the at least a portion of the database corresponding to the memory address range without first releasing the one of the timer object, the e-resource object, the handle object, or the work-item object (at operation 234). The one or more actions 220*a* alternatively or additionally includes at least one of causing the system to crash; capturing memory dump data regarding a system crash; creating a logging event; and/or enforcing the system rule associated with the one of the timer object, the e-resource object, the handle object, or the work-item object, contemporaneous with violation of the system rule (at operation 236). In example, the one or more actions 220*a* alternatively or additionally include, for a timer rule violation and without an object tracking mechanism or database, a validation thread walks a timer list for each memory-free call to identify whether each timer is contained the memory about to be freed. However, this action significantly slows down system and leads to the system being frozen, which results in the blocking of many other rule validations. For the rule pertaining to an exclusive lock (e.g., where the driver should only grab such lock once at a time), marking or use of a tracking database may be used.

Referring to FIG. 2B, system rule 205*b* includes a rule 238 indicating that system lock objects should be used one at a time. In examples, the one or more trigger events 210*b* includes at least one of: (a) detecting, intercepting, or redirecting an API call 240 to use a system lock object; or (b) an indication 242 that a system component is attempting to use a system lock object. In response to (and contemporaneous with) the one or more trigger events 210*b*, the computing system and/or the validation tool may determine whether a system lock object had previously not been removed from a database after having previously been released (at operation 244).

In some examples, the one or more actions 220*b* triggered in response to system rule violation includes generating an error check, contemporaneous with the second trigger event, to identify a root cause of the violation of the system rule associated with the system lock object (at operation 246). The one or more actions 220*b* alternatively or additionally includes sending a message(s) indicating an error (at operation 248). In examples, sending the message(s) (at operation 248) includes at least one of sending a message to a user indicating an error caused by the violation of the system rule associated with the system lock object; or sending a message to an OS kernel indicating an error caused by the violation of the system rule associated with the system lock object. The one or more actions 220*b* alternatively or additionally includes identifying a faulty system component or faulty system driver that failed to remove the system lock object from the database after previously releasing the system lock object (at operation 250). The one or more actions 220*b* alternatively or additionally includes at least one of causing the system to crash; capturing memory dump data regarding a system crash; creating a logging event; and/or enforcing the system rule associated with the system lock object, contemporaneous with violation of the system rule (at operation 252).

Turning to FIG. 2C, system rule 205*c* includes a rule 254 indicating that unregistered callback objects should be removed from memory blocks of the database. In examples, the one or more trigger events 210*c* includes at least one of: (a) detecting, intercepting, or redirecting an API call 256 to register a callback object; or (b) an indication 258 that a system driver is attempting to register a callback object. In response to (and contemporaneous with) the one or more trigger events 210*c*, the computing system and/or the validation tool may determine whether a callback object had previously not been removed from a database after having previously been unregistered (at operation 260).

In some examples, the one or more actions 220*c* triggered in response to system rule violation includes generating an error check, contemporaneous with the third trigger event, to identify a root cause of the violation of the system rule associated with the callback object (at operation 262). The one or more actions 220*c* alternatively or additionally includes sending a message(s) indicating an error (at operation 264). In examples, sending the message(s) (at operation 264) includes at least one of sending a message to a user indicating an error caused by the violation of the system rule associated with the callback object; or sending a message to an OS kernel indicating an error caused by the violation of the system rule associated with the callback object. The one or more actions 220*c* alternatively or additionally includes identifying a faulty system driver that failed to remove the callback object from the database after previously unregistering the callback object (at operation 266). The one or more actions 220*c* alternatively or additionally includes at least one of causing the system to crash; capturing memory dump data regarding a system crash; creating a logging event; and/or enforcing the system rule associated with the callback object, contemporaneous with violation of the system rule (at operation 268).

These and other functions of the example 200 (and its components) are described in greater detail herein with respect to FIGS. 1, 3, and 4A-4C.

FIG. 3 depicts an example UI 300 for displaying results of an error check initiated when implementing system object tracking for rule violation detection. Although FIG. 3 depicts a particular graphical user interface ("GUI") (e.g., UI 305) for displaying results of an error check when implementing system object tracking for rule violation detection, the various embodiments are not so limited, and any suitable UI or GUI may be utilized. In some cases, a text editor, an OS configuration settings editor, or registry editing tool may be used instead of a UI or GUI. As shown in FIG. 3, UI or editor 305 includes a header portion (which may include a name or title of the UI, in this case, "System Object Tracking UI"), a display field 315, an line number portion 320, a child stack pointer ("Child-SP") portion 325 for listing a value of stack pointers of a stack frame, a return address ("RetAddr") portion 330 for listing return addresses that belong to corresponding stack frames, a call site portion 335 for listing addresses of instructions (or return address including call instruction+call instruction length), and highlighted fields 340-350.

Referring to FIG. 3, an example of system object tracking (in this case, timer object tracking) is shown, with a violation code for a timer violation (in this case, violation code "C4") being highlighted by highlighted field 340, while the call instruction for checking for timer rule violation (in this case, "CheckTimerRuleViolation") is highlighted by highlighted field 345, and the result of the error check (in this case, "Vft_ObjTrk_TimerViolation1") is highlighted by highlighted field 350.

In some examples, call instructions may include a call to check if a lookaside list is contained in a memory or pool block being freed, an example of such a call instruction including the following:

FREE_CHECK_LOOKASIDE (p, Size, PoolFlags);

In some examples, call instructions may include a call to check if a timer is currently active in a memory or pool block, an example of such a call instruction including the following:

FREE_CHECK_KTIMER (p, Size);

In some examples, call instructions may include a call to check if an e-resource is currently active in a memory or pool block, an example of such a call instruction including the following:

FREE_CHECK_ERESOURCE (p, Size);

In some examples, call instructions may include a call to search worker queues for work items that are still queued, an example of such a call instruction including the following:

FREE_CHECK_WORKER (p, Size);

Object tracking APIs may include one or more of the following:

DifRegisterObjectTracking;
DifObjTrkInsertItem;
DifObjTrkRemoveItem; and/or
DifObjTrkQueryInvokeDeleteRange.

FIGS. 4A-4C depict various examples methods 400A-400C for implementing system object tracking for rule violation detection.

In the example of FIG. 4A, method 400A, at operation 405, includes, in response to a first trigger event, tracking, in some cases using a validation tool, a system object by tracking a tracker object corresponding to a memory address range of a database that has been allocated to the system object. At operation 410, method 400A further includes, contemporaneous with the first trigger event, determining, based on tracking of the tracker object, whether a system rule associated with the system object has been violated. Method 400A further includes, at operation 415, based on a determination that a system rule associated with the system object has been violated, triggering at least one first action associated with the system object.

In some examples, the system object includes one of a resource object, a worker object, or a lookaside object. In an example, the first trigger event includes at least one of detecting a first API call associated with the system object; or intercepting or redirecting the first API call. Alternatively or additionally, in another example, the first trigger event includes at least one of detecting a second API call associated with the memory address range that has been allocated to the system object; or intercepting or redirecting the second API call. Alternatively or additionally, in yet another example, the first trigger event includes receiving a published message indicating that at least a portion of the database corresponding to the memory address range is being freed, after subscribing to system messages related to freeing memory blocks. Alternatively or additionally, in still another example, the first trigger event includes at least one of determining that a system component is at least attempting to use the system object; or determining that a system driver is at least attempting to register the system object.

In an example, the at least one first action being triggered includes generating an error check, contemporaneous with the first trigger event, to identify a root cause of the violation of the system rule associated with the system object. Alternatively or additionally, in another example, the at least one first action being triggered includes at least one of sending a message to a user indicating an error caused by the violation of the system rule associated with the system object; or sending a message to an OS kernel indicating an error caused by the violation of the system rule associated with the system object. Alternatively or additionally, in yet another example, the at least one first action being triggered includes at least one of identifying a first system driver that freed the at least a portion of the database corresponding to the memory address range without first releasing the system object; identifying a system component that failed to remove the system object from the database after previously releasing the system object; or identifying a second system driver that failed to remove the system object from the database after previously unregistering the system object. Alternatively or additionally, in still another example, the at least one first action being triggered includes at least one of causing the system to crash; capturing memory dump data regarding a system crash; creating a logging event; or enforcing the system rule associated with the system object, contemporaneous with violation of the system rule.

Referring to FIG. 4B, method 400B, at operation 420, includes, in response to a second trigger event, tracking, in some cases using a validation tool, a system object by tracking a tracker object corresponding to a memory address range of a database that has been allocated to the system object. At operation 425, method 400B further includes, contemporaneous with the second trigger event and in response to determining, based on tracking of the tracker object, that at least a portion of the database corresponding to the memory address range is being freed, determining, using the validation tool, whether the at least a portion of the database, at the time of being freed, contains the system object, or whether the system lock object had previously been released but had not previously been removed from the database. Method 400B further includes, at operation 430, based on a determination that the at least a portion of the database, at the time of being freed, contains the system object, which indicates that a system rule associated with the system object has been violated, triggering, using the validation tool, at least one second action associated with the system object.

In some examples, the system object includes one of a timer object, an e-resource object, a handle object, or a work-item object. In examples, the system rule indicates that active timer objects, active e-resource objects, active handle objects, or active work-item objects should be released from memory blocks of the database that are being freed.

In an example, the second trigger event includes at least one of detecting a third API call associated with the one of the timer object, the e-resource object, the handle object, or the work-item object; or intercepting or redirecting the third API call. Alternatively or additionally, in another example, the second trigger event includes at least one of detecting a fourth API call associated with the memory address range that has been allocated to the one of the timer object, the e-resource object, the handle object, or the work-item object; or intercepting or redirecting the fourth API call. Alternatively or additionally, in yet another example, the second trigger event includes receiving a published message indicating that at least a portion of the database corresponding to the memory address range is being freed, after subscribing to system messages related to freeing memory blocks.

In an example, the at least one first second action being triggered includes generating an error check, contemporaneous with the second trigger event, to identify a root cause of the violation of the system rule associated with the one of the timer object, the e-resource object, the handle object, or the work-item object. Alternatively or additionally, in another example, the at least one first second action being triggered includes at least one of sending a message to a user indicating an error caused by the violation of the system rule associated with the one of the timer object, the e-resource object, the handle object, or the work-item object; or sending a message to an OS kernel indicating an error caused by the violation of the system rule associated with the one of the timer object, the e-resource object, the handle object, or the work-item object. Alternatively or additionally, in yet another example, the at least one first second action being triggered includes identifying a driver that freed the at least a portion of the database corresponding to the memory address range without first releasing the one of the timer object, the e-resource object, the handle object, or the work-item object. Alternatively or additionally, in still another example, the at least one first second action being triggered includes at least one of causing the system to crash; capturing memory dump data regarding a system crash; creating a logging event; or enforcing the system rule associated with the one of the timer object, the e-resource object, the handle object, or the work-item object, contemporaneous with violation of the system rule.

Turning to FIG. 4C, method 400C, at operation 435, includes, in response to a third trigger event, tracking, in some cases using a validation tool, a system object by tracking a tracker object corresponding to a memory address range of a database that has been allocated to the system object. At operation 440, method 400C further includes, contemporaneous with the third trigger event and in response to determining, based on tracking of the tracker object, that a system component or system driver is using or registering the system object, determining whether the system object had previously been removed from the database after having previously been released or unregistered. Method 400C further includes, at operation 445, based on a determination that the at least a portion of the database, at the time of being freed, contains the system object, which indicates that a system rule associated with the system object has been violated, triggering at least one third action associated with the system object.

In some examples, the system object includes one of a system lock object that is used for synchronization purposes or a callback object. In examples, the system rule indicates that the system lock object should be used one at a time or indicates that unregistered callback objects should be removed from memory blocks of the database. In an example, the third trigger event includes at least one of detecting a fifth API call associated with the system lock object or the callback object; or intercepting or redirecting the fifth API call. Alternatively or additionally, in another example, the third trigger event includes at least one of detecting a sixth API call associated with the memory address range that has been allocated to the system lock object or the callback object; or intercepting or redirecting the sixth API call. Alternatively or additionally, in yet another example, the third trigger event includes at least one of determining that the system component is at least attempting to use the system lock object; or determining that the system driver is at least attempting to register the callback object.

In an example, the at least one third action being triggered includes generating an error check, contemporaneous with the third trigger event, to identify a root cause of the violation of the system rule associated with the system lock object or the callback object. Alternatively or additionally, in another example, the at least one third action being triggered includes at least one of sending a message to a user indicating an error caused by the violation of the system rule associated with the system lock object or the callback object; or sending a message to an OS kernel indicating an error caused by the violation of the system rule associated with the system lock object or the callback object. Alternatively or additionally, in yet another example, the at least one third action being triggered includes at least one of identifying a system component that failed to remove the system lock object from the database after previously releasing the system lock object; or identifying a system driver that failed to remove the callback object from the database after previously unregistering the callback object. Alternatively or additionally, in still another example, the at least one third action being triggered includes at least one of causing the system to crash; capturing memory dump data regarding a system crash; creating a logging event; or enforcing the system rule associated with the system lock object or the callback object, contemporaneous with violation of the system rule.

While the techniques and procedures in methods 400A-400C are depicted and/or described in a certain order for purposes of illustration, it should be appreciated that certain procedures may be reordered and/or omitted within the scope of various embodiments. Moreover, while the methods 400A-400C may be implemented by or with (and, in some cases, are described below with respect to) the systems, examples, or embodiments 100, 200A, 200B, 200C, and 300 of FIGS. 1, 2A, 2B, 2C, and 3, respectively (or components thereof), such methods may also be implemented using any suitable hardware (or software) implementation. Similarly, while each of the systems, examples, or embodiments 100, 200A, 200B, 200C, and 300 of FIGS. 1, 2A, 2B, 2C, and 3, respectively (or components thereof), can operate according to the methods 400A-400C (e.g., by executing instructions embodied on a computer readable medium), the systems, examples, or embodiments 100, 200A, 200B, 200C, and 300 of FIGS. 1, 2A, 2B, 2C, and 3 can each also operate according to other modes of operation and/or perform other suitable procedures.

As should be appreciated from the foregoing, the present technology provides multiple technical benefits and solutions to technical problems. For instance, error checks for determining causes of violations of system rules generally raises technical problems. For example, one technical problem includes that rule violations may occur without notice until a kernel attempts to use, access, or register a system object, depending on the type of system object. However, by the time an error check is performed to identify the cause of a system error caused by the rule violation, the root cause may be long in the past and thus may be difficult (if not no longer possible) to pinpoint. The present technology provides for system object tracking for rule violation detection. In various examples, in response to a first trigger event, a computing system may track a system object by tracking a tracker object corresponding to a memory address range of a database that has been allocated to the system object. Contemporaneous with the first trigger event, the computing system determines, based on tracking of the tracker object, whether a system rule associated with the system object has been violated. Based on a determination that a system rule associated with the system object has been violated, the computing system triggers at least one action associated with the system object, including performing a contemporaneous error check, sending messages indicating an error caused by violation of the system rule associated with the system object, identifying a system component or driver that caused the error, and/or causing an immediate system crash. In this manner, the computing system can respond to the rule violation soon after the violation occurs, where the current state of the OS (including evidence related to the error caused by the rule violation) is still available (and, in a way, preserved by such contemporaneous actions).

FIG. 5 depicts a block diagram illustrating physical components (i.e., hardware) of a computing device 500 with which examples of the present disclosure may be practiced. The computing device components described below may be suitable for a client device implementing the system object tracking for rule violation detection, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as system object tracking 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including one or more of the operations of the method(s) as illustrated in FIGS. 4A-4C, or one or more operations of the system(s) and/or apparatus(es) as described with respect to FIGS. 1-3, or the like. Other program modules that may be used in accordance with examples of the present disclosure may include applications such as electronic mail and contacts applications, word processing applications, spreadsheet applications, database applications, slide presentation applications, drawing or computer-aided application programs, artificial intelligence ("AI") applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims.

Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:
a processing system; and
memory coupled to the processing system, the memory comprising computer executable instructions that, when executed by the processing system, causes the system to perform operations comprising:
detecting a first trigger event, wherein detecting the first trigger event comprises detecting an API call to use a system object or to free a memory address range of a database that has been allocated to the system object;
in response to detecting the first trigger event, tracking the system object by tracking a tracker object corresponding to the memory address range, wherein tracking the tracker object comprises maintaining a database entry associating the memory address range with the system object;

contemporaneous with detecting the first trigger event, determining, based on tracking of the tracker object, whether a system rule associated with the system object has been violated, wherein determining whether the system rule has been violated comprises checking the database entry; and based on a determination that a system rule associated with the system object has been violated, triggering at least one action associated with the system object.

2. The system of claim 1, wherein the system object includes one of a timer object, an electronic resource ("e-resource") object, a handle object, or a work-item object, wherein the system rule indicates that active timer objects, active e-resource objects, active handle objects, or active work-item objects are to be released from memory blocks of the database that are being freed, wherein determining whether the system rule associated with the system object has been violated contemporaneous to the first trigger event comprises:

in response to determining that at least a portion of the database corresponding to the memory address range is being freed, determining whether the at least a portion of the database, at a time of being freed, contains the one of the timer object, the e-resource object, the handle object, or the work-item object.

3. The system of claim 2, wherein the first trigger event includes:

receiving a published message indicating that the at least a portion of the database corresponding to the memory address range is being freed, after subscribing to system messages related to freeing memory blocks.

4. The system of claim 3, wherein the at least one action being triggered comprises:

identifying a driver that freed the at least a portion of the database corresponding to the memory address range without first releasing the one of the timer object, the e-resource object, the handle object, or the work-item object.

5. The system of claim 1, wherein the system object includes one of a resource object, a worker object, or a lookaside object, wherein the first trigger event includes:

receiving a published message indicating that at least a portion of the database corresponding to the memory address range is being freed, after subscribing to system messages related to freeing memory blocks.

6. The system of claim 5, wherein the at least one action being triggered comprises at least one of:

generating an error check, contemporaneous with the first trigger event, to identify a root cause of the violation of the system rule associated with the one of the resource object, the worker object, or the lookaside object;

identifying a first system driver that freed the at least a portion of the database corresponding to the memory address range without first releasing the one of the resource object, the worker object, or the lookaside object; or identifying a system component that failed to remove the system object from the database after previously releasing the one of the resource object, the worker object, or the lookaside object.

7. The system of claim 1, wherein the system object includes a lock that is used for synchronization purposes, wherein the system rule indicates that the lock is to be used one at a time, wherein determining whether the system rule associated with the system object has been violated contemporaneous to the first trigger event comprises:

in response to determining that a system component is using the lock, determining whether the lock had previously been removed from the database after having previously been released.

8. The system of claim 7, wherein the first trigger event includes at least one of:

detecting an API call associated with grabbing the lock;

intercepting or redirecting the API call associated with grabbing the lock;

detecting an API call associated with releasing the lock;

intercepting or redirecting the API call associated with releasing the lock; or determining that a system thread is at least attempting to grab the lock again after the system thread had previously grabbed the lock.

9. The system of claim 8, wherein the at least one action being triggered comprises at least one of:

generating an error check, contemporaneous with the first trigger event, to identify a root cause of the violation of the system rule associated with the system object; or identifying a system component that attempts to grab the lock again in the system thread.

10. The system of claim 1, wherein the system object includes a callback object, wherein the system rule indicates that unregistered callback objects are to be removed from memory blocks of the database, wherein determining whether the system rule associated with the system object has been violated contemporaneous to the first trigger event comprises:

in response to determining that a system driver is registering the callback object, determining whether the callback object had previously been removed from the database after having previously been unregistered.

11. The system of claim 10, wherein the first trigger event includes at least one of:

detecting an API call associated with the callback object;

intercepting or redirecting the API call associated with the callback object;

detecting an API call associated with the memory address range that has been allocated to the callback object;

intercepting or redirecting the API call associated with the memory address range that has been allocated to the callback object; or determining that the system driver is at least attempting to register the callback object.

12. The system of claim 11, wherein the at least one action being triggered comprises at least one of:

generating an error check, contemporaneous with the first trigger event, to identify a root cause of the violation of the system rule associated with the callback object; or identifying a system driver or component that failed to unregister the callback object from the database at a time of a driver unload event.

13. A computer-implemented method, comprising:

in response to a first trigger event, tracking, using a validation tool, a system object by tracking a tracker object corresponding to a memory address range of a database that has been allocated to the system object;

contemporaneous with the first trigger event and in response to determining, based on tracking of the tracker object, that at least a portion of the database corresponding to the memory address range is being freed, determining, using the validation tool, whether the at least a portion of the database, at a time of being freed, contains the system object; and based on a determination that the at least a portion of the database, at the time of being freed, contains the system object, which indicates that a system rule associated with the system object has been violated, triggering, using the validation tool, at least one action associated with the system object.

14. The computer-implemented method of claim 13, wherein the system object includes one of a timer object, an electronic resource ("e-resource") object, a handle object, or a work-item object, wherein the system rule indicates that active timer objects, active e-resource objects, active handle objects, or active work-item objects are to be released from memory blocks of the database that are being freed.

15. The computer-implemented method of claim 13, wherein the first trigger event includes:

receiving a published message indicating that the at least a portion of the database corresponding to the memory address range is being freed, after subscribing to system messages related to freeing memory blocks.

16. The computer-implemented method of claim 15, wherein the at least one action being triggered comprises at least one of:

generating an error check, contemporaneous with the first trigger event, to identify a root cause of the violation of the system rule associated with the one of a timer object, an electronic resource ("e-resource") object, a handle object, or a work-item object; or identifying a driver that freed the at least a portion of the database corresponding to the memory address range without first releasing the one of the timer object, the e-resource object, the handle object, or the work-item object.

17. A system, comprising:

a processing system; and memory coupled to the processing system, the memory comprising computer executable instructions that, when executed by the processing system, causes the system to perform operations comprising:

in response to a first trigger event, tracking a system object by tracking a tracker object corresponding to a memory address range of a database that has been allocated to the system object;

contemporaneous with the first trigger event and in response to determining, based on tracking of the tracker object, that a system component or system driver is using or registering the system object, determining whether the system object had previously been removed from the database after having previously been released or unregistered; and based on a determination that the at least a portion of the database, at a time of being freed, contains the system object, which indicates that a system rule associated with the system object has been violated, triggering at least one action associated with the system object.

18. The system of claim 17, wherein the system object includes one of a system lock object that is used for synchronization purposes or a callback object, wherein the system rule indicates that the system lock object is to be used one at a time or indicates that unregistered callback objects are to be removed from memory blocks of the database.

19. The system of claim 18, wherein the first trigger event includes at least one of:

detecting a first API call associated with the system lock object or the callback object;

intercepting or redirecting the first API call;

detecting a second API call associated with the memory address range that has been allocated to the system lock object or the callback object;

intercepting or redirecting the second API call;

determining that the system component is at least attempting to use the system lock object; or determining that the system driver is at least attempting to register the callback object.

20. The system of claim 19, wherein the at least one action being triggered comprises at least one of:

generating an error check, contemporaneous with the first trigger event, to identify a root cause of the violation of the system rule associated with the system lock object or the callback object; or identifying a system component that failed to remove the system lock object from the database after previously releasing the system lock object.

* * * * *